METHOD OF ENCLOSING AN ELECTRICAL DEVICE

Filed Aug. 10, 1965 2 Sheets-Sheet 1

INVENTORS
John W. Asher
Francis W. Martin
Walter H. Tarcza

Walter E. Zebrowski
ATTORNEY

METHOD OF ENCLOSING AN ELECTRICAL DEVICE

Filed Aug. 10, 1965 2 Sheets-Sheet 2

INVENTORS
John W. Asher
Francis W. Martin
Walter H. Tarcza

ATTORNEY

United States Patent Office 3,405,441
Patented Oct. 15, 1968

3,405,441
METHOD OF ENCLOSING AN ELECTRICAL DEVICE

John W. Asher, Elmira, and Francis W. Martin and Walter H. Tarcza, Painted Post, N.Y., assignors to Corning Glass Works, Corning, N.Y., a corporation of New York
Filed Aug. 10, 1965, Ser. No. 478,690
5 Claims. (Cl. 29—627)

ABSTRACT OF THE DISCLOSURE

A method of forming a hermetic seal about a thin film microcircuit without deleteriously affecting the circuit components is disclosed. A thin flexible sheet of material having an adherent film of vitreous material on one side thereof is disposed over a flat dielectric substrate on which an electrical device is disposed. Heat and pressure are applied to the assembly about the peripheral edge of the sheet to fuse the vitreous film to the substrate, thereby hermetically enclosing the device. The resulting small sized hermetically sealed enclosure is economically and easily manufactured.

Electrical, or electronic devices such as integrated circuits, transistors, diodes, semiconductors, and the like are commonly sealed in a "flatpack" which is a container or enclosure having a body of electrically insulating material. Such a body is formed with a relatively large planar bottom wall surrounded by a rim defining a cavity within which an electrical device is disposed. Leads extending from within said cavity to the outside of said body are provided. The electrical device is connected to said leads within said cavity and is enclosed therein by a rigid cover plate disposed over the cavity and sealed to said rim.

Such devices are also commonly sealed in "cans" by first being mounted on a plate through which the leads pass, and thereafter being enclosed within a metallic cup-like member attached or sealed to said plate, as for example, by means of crimping the can about the plate edge, cementing, soldering, or the like.

Prior art methods of enclosing electrical devices involved sealing temperatures and cycles which deleteriously affected the devices causing their electrical properties and characteristics to change. Further, such methods: were costly as a result of both numerous parts required and time necessary for assembly and sealing; did not provide for maintaining heat away from the device during sealing or for efficient heat removal; did not necessarily result in hermetically sealed enclosures; resulted in large bulky enclosures; and the like.

It is an object of the present invention to provide a hermetic enclosure, an electrical device assembly, and a method of manufacture which overcome the heretofore noted disadvantages.

A further object of the present invention is to provide an economic method for hermetically enclosing electrical devices without deleteriously affecting their electrical properties or characteristics.

Another object is to provide efficient means for heat removal away from an electrical device during encapsulation thereof.

A further object is to provide a hermetically sealed enclosure having a small size, which enclosure is noted for its economy and ease of manufacture.

A still further object is to provide a small, economic, hermetically sealed electronic device.

Broadly according to the instant invention an enclosure may be manufactured by providing a substrate and a sheet of flexible material; applying to one surface of the sheet an adherent film of vitreous material having a coefficient of thermal expansion compatible with that of the substrate and a softening temperature less than the melting temperature of the substrate and sheet materials; forming an assembly by placing the film surface of the sheet adjacent the substrate; providing a tool having a rim defining a cavity in one end thereof; and sealing the sheet to the substrate by disposing the tool rim substantially about the periphery of the sheet, heating the rim end of the tool and applying pressure to the assembly by means of said tool, whereby the film is fused and sealed to the substrate substantially about the periphery of the sheet.

Additional objects, features, and advantages of the present invention will become apparent to those skilled in the art, from the following detailed description and the attached drawing on which, by way of example, only the preferred embodiments of this invention are illustrated.

For the purposes of simplicity this invention will be described in terms of encapsulating a thin film microcircuit although, as will be readily understood in the art, other devices such as transistors, semiconductors, other film circuits and the like can be similarly hermetically encapsulated.

Figures 1, 2, 3, 4:
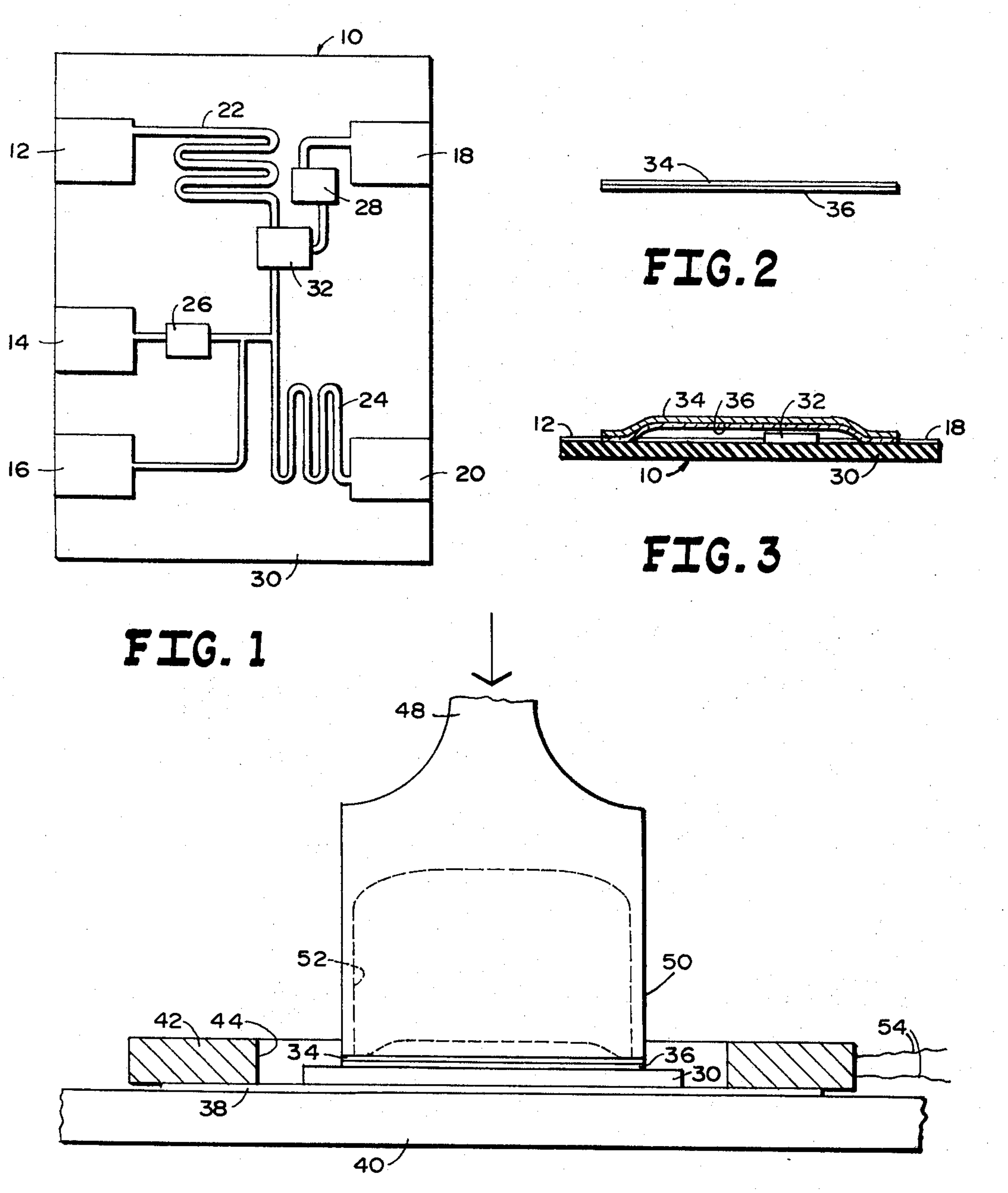
FIGURE 1 is a plan view of a thin film microcircuit unit.
FIGURE 2 is an elevation of a sheet of flexible material having a vitreous coating applied thereto.
FIGURE 3 is a cross sectional view of an assembly of a microcircuit unit and a flexible coated sheet.
FIGURE 4 is an elevation of an apparatus illustrating the method of encapsulating a microcircuit unit in accordance with the present invention.

Referring to FIGURE 1, a thin film microcircuit unit 10 is illustrated having circuit contact plates 12, 14, 16, 18, and 20, resistors 22 and 24, and capacitors 26 and 28, formed on substrate 30, to which circuit transistor chip 32 is connected. The circuit elements and connections therebetween are formed or attached by any of various methods, well known in the art which methods do not form part of the present invention. The substrate materials may be any suitable dielectric material such as ceramics for example alumina, and beryllia, glazed metal, glazed ceramic, glass-ceramic, or combinations thereof.

A thin flexible sheet 34 having an adherent coating 36 of vitreous glazing material is shown in FIGURE 2. A particularly suitable material for sheet 34 is aluminum, however, other materials such as copper, nickel-iron, stainless steel, or the like may also be used. The vitreous glazing material must have a coefficient of thermal expansion compatible with that of the substrate material, that is, sufficiently close to that of the substrate material so that when the coated sheet is sealed to the substrate excessive stresses will not be set up within the glazing material upon cooling. Such excessive stresses may cause the glazing material to check or crack making a hermetic seal impossible. In addition, the glazing material must adhere well to both the flexible sheet and the substrate, and must have a high resistivity and low dielectric constant.

Examples of some suitable glazing material compositions include those of the type described in copending patent application Ser. No. 401,221, filed Oct. 2, 1964, entitled "Sealing Glasses and Method," by F. Martin. These compositions comprise, in percent by weight on an oxide basis, from about 60% to 80% PbO, from 5% to 18% $TiO_2$, at least 1% $B_2O_3$, and at least 5% $SiO_2$, the total of $B_2O_3$ and $SiO_2$ being from 10% to 20%. These compositions may optionally comprise from a trace up to 20% of at least one divalent metal oxide selected from the group consisting of BaO and ZnO, the total of the divalent metal oxides, including PbO, being from 60% to 80%. Compositions especially suitable for the present purposes are those containing from about 10% to 13% of $TiO_2$.

Referring to FIGURE 3, microcircuit unit 10 is shown assembled with the coated thin flexible sheet 34 so that portions of the contact plates extend beyond the edges of the sheet for reasons hereinafter described.

A spacer 38 is disposed between anvil or support 40 and induction heating ring 42, as shown in FIGURE 4. An assembly, as described in connection with FIGURE 3, is placed on spacer 38 within cavity 44 of induction heating ring 42 with substrate 30 in contact with the spacer. One end of tool 48 is placed in contact with sheet 34 such that rim 50, defining cavity 52, is disposed substantially about the periphery of sheet 34. Tool 48 is formed of material which is a good susceptor for inductive energy. Suitable materials are stainless steel or the like and one familiar with the art can readily select a suitable material. After a force is applied to the assembly by tool 48 along the longitudinal axis thereof in the direction of the arrow shown, the rim end of the tool is suitably heated causing vitreous material coating 36 to fuse to substrate 30 and the various contact plates, thereby hermetically enclosing the circuit formed on the substrate. Tool 48 is heated by induction coil 42 when leads 54 are connected to a suitable source of electrical energy. By using induction heating, heat is concentrated in the tool while the assembly can be maintained relatively cool. By forming the assembly from materials which are poor susceptors of inductive energy, such as those herein described, the assembly temperature will not significantly increase when the tool is heated. In accordance with the method of the present invention, heat necessary for sealing is concentrated in the tool and transferred to the assembly along the periphery of sheet 34 where rim 50 is in contact with the sheet thereby substantially keeping heat away from the enclosed device. By maintaining only a thin rim at the sealing end of tool 48, heat can be further concentrated while the tool end can be readily heated by the induction coil thereby maintaining the time during which the heat could be transferred to the encapsulated device at a minimum.

Figure 5:
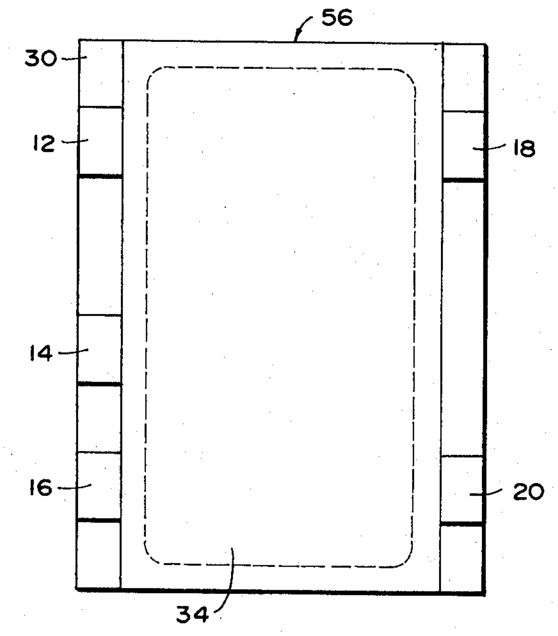
FIGURE 5 is a plan view of a device encapsulated in accordance with the present invention.

FIGURE 5 illustrates a completed device 56. Contact plates 12, 14, 16, 18, and 20 are shown extending beyond edges of sheet 34 so that contact can be made with the various encapsulated circuit elements. Sheet 34 is shown hermetically sealed to substrate 30 about the periphery of the sheet.

Figure 6:
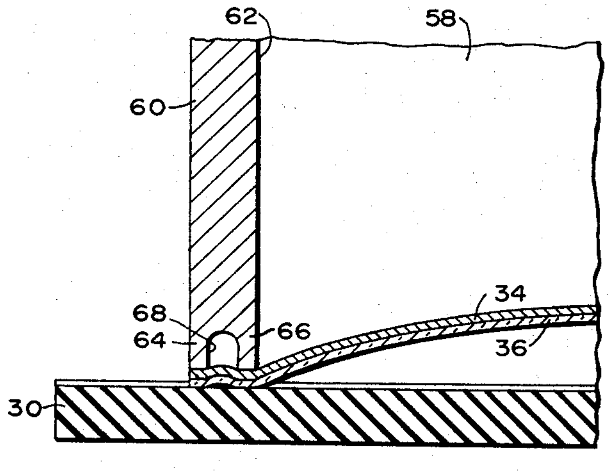
FIGURE 6 is a fragmentary cross sectional elevation of another embodiment of the present invention.

FIGURE 6 illustrates another embodiment of this invention. A tool 58, otherwise similar to that hereinabove described, is constructed so that rim 60, defining cavity 62, has two spaced, coaxial sealing members 64 and 66 separated by channel 68 formed in the sealing end thereof. As pressure is applied by heated tool 58 to sheet 34, it is sealed to substrate 30 by means of vitreous coating 36 in two thin parallel seals. In such an embodiment members 64 and 66 may be formed very thin which enables higher sealing pressures and lower sealing temperatures to be used. In addition the double seal increases reliability.

A typical example of this invention is illustrated by the following. Vitreous glazing material having a thickness of about 5 mils and comprising by weight about 68% PbO, 12% $TiO_2$, 8% $SiO_2$, 5% ZnO, and 7% $B_2O_3$ was adherently applied to one flat surface of an aluminum sheet having a thickness of about 3 mils. The glazing material was applied by forming a layer of a frit of the material on the sheet and thereafter firing the composite in a furnace at 620° C. for 20 minutes. An electronic microcircuit device was formed comprising a network of metallic oxide film resistors with interconnecting copper conductors and contact plates applied to a glazed alumina substrate.

A stainless steel tool having a thin walled rim defining a cavity in one end was provided. The rim substantially corresponded to the aluminum sheet in shape and size, and had a thickness of about 0.020 inch. Stainless steel is a good susceptor and can be readily heated by inductive energy.

The microcircuit device was placed on a spacer within the cavity of a rigidly supported induction coil. The tool was brought into contact with the aluminum sheet at the periphery thereof and then inductively heated to a temperature of from about 500° C. to 550° C. A pressure of about 285 p.s.i. was applied by said tool to the seal area for about 2 minutes by means of a press connected to said tool.

The resulting encapsulated electronic circuit was found to be hemetically sealed while the electrical properties and characteristics of the electrical components thereof were not significantly changed.

Another example is illustrated by an assembly wherein the substrate is formed of beryllia and a 5 mil thickness of vitreous material glaze is applied to a 3 mil thick copper sheet.

Other examples of particularly suitable combinations of materials are an aluminum cover sheet with a substrate of unglazed alumina, beryllia, or glass-ceramic; or a copper cover sheet with a substrate of glass-ceramic, or glazed or unglazed alumina.

The sealing tool has been described as being heated by an induction coil, however, it may also be heated by other means such as a furnace, flame, resistance or others, however, care must be exercised to minimize heating of the electronic device itself while the tool is being heated.

Although the present invention has been described with respect to specific details of certain embodiments thereof, it is not intended that such details be limitations upon the scope of the invention except insofar as set forth in the following claims.

We claim:

1. The method of enclosing an electrical device comprising the steps of:
providing a flat dielectric substrate having an electrical device disposed thereon,
providing a thin flexible sheet of impervious material, applying an adherent film of vitreous material to one surface of said sheet, said vitreous material having a coefficient of thermal expansion compatible with that of said substrate, the sheet and substrate materials having a melting temperature in excess of the softening temperature of said vitreous material,
disposing said sheet over said device with said film adjacent said substrate to form an assembly,
providing a tool having a rim defining a cavity in one end, the rim periphery substantially corresponding to that of said sheet,
disposing said rim about the periphery of said sheet, and
applying heat and pressure to said assembly about the peripheral edge of said sheet by means of said tool to fuse said film to said substrate thereby hermetically enclosing said device.

2. The method of claim 1 wherein said rim of said tool is heated by inductive energy.

3. The method of enclosing an electrical device comprising the steps of:
applying an adherent film of vitreous material to one surface of a flexible sheet of material,
disposing said sheet over an electrical device disposed on a flat dielectric substrate with said film adjacent said substrate to form an assembly, said vitreous material having a coefficient of thermal expansion compatible with said substrate, the sheet and substrate materials having a melting temperature in excess of the softening temperature of said vitreous material,
providing a tool having a rim defining a cavity in one end, the rim periphery substantially corresponding to that of said sheet, disposing said rim about the periphery of said sheet, and applying heat and pressure to said assembly about the peripheral edge of said sheet by means of said tool to fuse said film to said substrate thereby hermetically enclosing said device.

4. The method of claim 3 wherein said rim of said tool is heated by inductive energy.

5. The method of enclosing an electrical device comprising the steps of:

providing a flat dielectric substrate having an electrical device disposed thereon, providing a thin flexible metallic sheet, applying an adherent film of vitreous material having a coefficient of thermal expansion compatible with that of said substrate, the sheet and substrate materials having a melting temperature in excess of the softening temperature of said vitreous material, disposing said sheet over said device with said film adjacent said substrate to form an assembly, providing a tool having a rim comprising inner and outer spaced coaxial sealing members defining a cavity in one tool end, the outer sealing member periphery substantially corresponding to that of said sheet, disposing said sealing members about the periphery of said sheet, and applying heat and pressure to said assembly about the peripheral edge of said sheet by means of said spaced coaxial sealing members to fuse said film to said substrate thereby hermetically enclosing said device.

References Cited

UNITED STATES PATENTS

| | | | |
|---|---|---|---|
| 3,171,187 | 3/1965 | Ikeda et al. | |
| 3,178,506 | 4/1965 | Dereich et al. | |
| 3,187,240 | 6/1965 | Clark. | |
| 3,105,868 | 10/1963 | Feigin et al. | 174—68.5 |

OTHER REFERENCES

Abandoned application Ser. No. 55,238, filed Sept. 12, 1960 by Moore et al. Only the single sheet of drawing and pages 6–8 of the specification relied on.

DARRELL L. CLAY, *Primary Examiner.*